US012783094B2

(12) United States Patent
Park et al.

(10) Patent No.: US 12,783,094 B2
(45) Date of Patent: Nov. 3, 2026

(54) TOUCH SENSOR, DISPLAY DEVICE INCLUDING THE SAME, AND ELECTRONIC DEVICE INCLUDING THE SAME

(71) Applicant: Samsung Display Co., LTD., Yongin-si (KR)

(72) Inventors: Sung Kyun Park, Yongin-si (KR); Yong Hwan Park, Yongin-si (KR); Ju Yeon Kim, Yongin-si (KR); Sae Young Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/022,626

(22) Filed: Jan. 15, 2025

(65) Prior Publication Data

US 2025/0383744 A1 Dec. 18, 2025

(30) Foreign Application Priority Data

Jun. 17, 2024 (KR) ........................ 10-2024-0078167
Aug. 30, 2024 (KR) ........................ 10-2024-0117504

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05)

(58) Field of Classification Search
CPC ..... G06F 3/0445; G06F 3/0446; G06F 3/0412
See application file for complete search history.

(56) References Cited

U.S. PATENT DOCUMENTS

| | | | | |
|---|---|---|---|---|
| 10,312,298 | B2 * | 6/2019 | Oh | G06F 3/03547 |
| 10,732,762 | B2 | 8/2020 | Na et al. | |
| 11,764,252 | B2 | 9/2023 | Bang et al. | |
| 12,039,127 | B2 | 7/2024 | Cho et al. | |
| 2018/0033829 | A1 * | 2/2018 | Oh | H10K 59/35 |
| 2020/0152707 | A1 * | 5/2020 | Won | H10K 59/8731 |
| 2020/0235186 | A1 * | 7/2020 | Jung | H10K 59/122 |
| 2022/0109028 | A1 * | 4/2022 | Park | G06F 3/0412 |
| 2023/0389376 | A1 | 11/2023 | Jang | |
| 2025/0228080 | A1 * | 7/2025 | Hou | G06F 3/0446 |

FOREIGN PATENT DOCUMENTS

| | | | |
|---|---|---|---|
| KR | 10-2021-0122955 | A | 10/2021 |
| KR | 10-2348106 | B1 | 1/2022 |
| KR | 10-2023-0165966 | A | 12/2023 |
| KR | 10-2023-0174333 | A | 12/2023 |

* cited by examiner

*Primary Examiner* — Peter D McLoone
(74) *Attorney, Agent, or Firm* — Womble Bond Dickinson (US) LLP

(57) ABSTRACT

A touch sensor includes: a touch-sensing area; and a touch non-sensing area around the touch-sensing area. The touch-sensing area includes: an interlayer insulating layer on an encapsulation layer; a first conductive layer on the interlayer insulating layer; a first organic layer on the interlayer insulating layer and the first conductive layer; a second conductive layer on the first organic layer; and an inorganic layer on the first organic layer and the second conductive layer.

23 Claims, 10 Drawing Sheets

TOUCH SENSOR, DISPLAY DEVICE INCLUDING THE SAME, AND ELECTRONIC DEVICE INCLUDING THE SAME

CROSS-REFERENCE TO RELATED APPLICATION

The present application claims priority to and the benefit of Korean Patent Application No. 10-2024-0078167, filed on Jun. 17, 2024, and Korean Patent Application No. 10-2024-0117504, filed on Aug. 30, 2024, in the Korean Intellectual Property Office, the entire disclosures of all of which are incorporated by reference herein.

BACKGROUND

1. Field

Aspects of some embodiments of the present disclosure relate to a touch sensor, a display device including the touch sensor, and an electronic device including the touch sensor.

2. Description of the Related Art

With the development of information technologies, the importance of a display device, which is a connection medium between a user and information, has increased. Accordingly, various display devices, such as a liquid crystal display device and an organic light emitting display device, are increasingly being used.

The display device may include a touch sensor that recognizes touch inputs as an input device.

The above information disclosed in this Background section is for enhancement of understanding of the background of the present disclosure, and therefore, it may contain information that does not constitute prior art.

SUMMARY

Some embodiments of the present disclosure may be directed to a touch sensor for preventing a corrosion, a display device including the touch sensor, and an electronic device including the touch sensor.

According to one or more embodiments of the present disclosure, a touch sensor includes: a touch-sensing area; and a touch non-sensing area around the touch-sensing area. The touch-sensing area includes: an interlayer insulating layer on an encapsulation layer; a first conductive layer on the interlayer insulating layer; a first organic layer on the interlayer insulating layer and the first conductive layer; a second conductive layer on the first organic layer; and an inorganic layer on the first organic layer and the second conductive layer.

In an embodiment, the inorganic layer may cover an upper surface and a side surface of the second conductive layer.

In an embodiment, the first organic layer may include first stepped portions adjacent to the second conductive layer.

In an embodiment, the inorganic layer may cover the first stepped portions of the first organic layer.

In an embodiment, a thickness of the inorganic layer may be about 200 angstroms to about 10000 angstroms.

In an embodiment, the inorganic layer may have openings that do not overlap with the first conductive layer and the second conductive layer.

In an embodiment, the first organic layer may include second stepped portions adjacent to the openings.

In an embodiment, the touch-sensing area may further include a second organic layer on the inorganic layer.

In an embodiment, the second organic layer may cover the second stepped portions of the first organic layer.

In an embodiment, the second organic layer may have a higher refractive index than that of the first organic layer.

In an embodiment, the second conductive layer may include first touch electrodes along a first direction, second touch electrodes along a second direction crossing the first direction, and a first connecting portion connecting the first touch electrodes to each other. The first conductive layer may include a second connecting portion connecting the second touch electrodes to each other. One of the second touch electrodes may be connected to the second connecting portion through a first contact hole penetrating the first organic layer, and another one of the second touch electrodes may be connected to the second connecting portion through a second contact hole penetrating the first organic layer.

According to one or more embodiments of the present disclosure, a display device includes: a display; a touch sensor on the display, the touch sensor including a touch-sensing area, and a touch non-sensing area around the touch-sensing area; and a polarizing layer on the touch sensor. The touch-sensing area includes: an interlayer insulating layer on an encapsulation layer of the display; a first conductive layer on the interlayer insulating layer; a first organic layer on the interlayer insulating layer and the first conductive layer; a second conductive layer on the first organic layer; and an inorganic layer on the first organic layer and the second conductive layer.

In an embodiment, the inorganic layer may cover an upper surface and a side surface of the second conductive layer.

In an embodiment, the first organic layer may include first stepped portions adjacent to the second conductive layer, and the inorganic layer may cover the first stepped portions of the first organic layer.

In an embodiment, a thickness of the inorganic layer may be about 200 angstroms to about 10000 angstroms.

In an embodiment, the inorganic layer may have openings that do not overlap with the first conductive layer and the second conductive layer.

In an embodiment, the first organic layer may include second stepped portions adjacent to the openings.

In an embodiment, the touch-sensing area may further include a second organic layer on the inorganic layer, and the second organic layer may cover the second stepped portions of the first organic layer.

In an embodiment, the second organic layer may have a higher refractive index than that of the first organic layer.

In an embodiment, the second conductive layer may include: first touch electrodes along a first direction; second touch electrodes along a second direction crossing the first direction; and a first connecting portion connecting the first touch electrodes to each other. The first conductive layer may include a second connecting portion connecting the second touch electrodes to each other. One of the second touch electrodes may be connected to the second connecting portion through a first contact hole penetrating the first organic layer, and another one of the second touch electrodes may be connected to the second connecting portion through a second contact hole penetrating the first organic layer.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
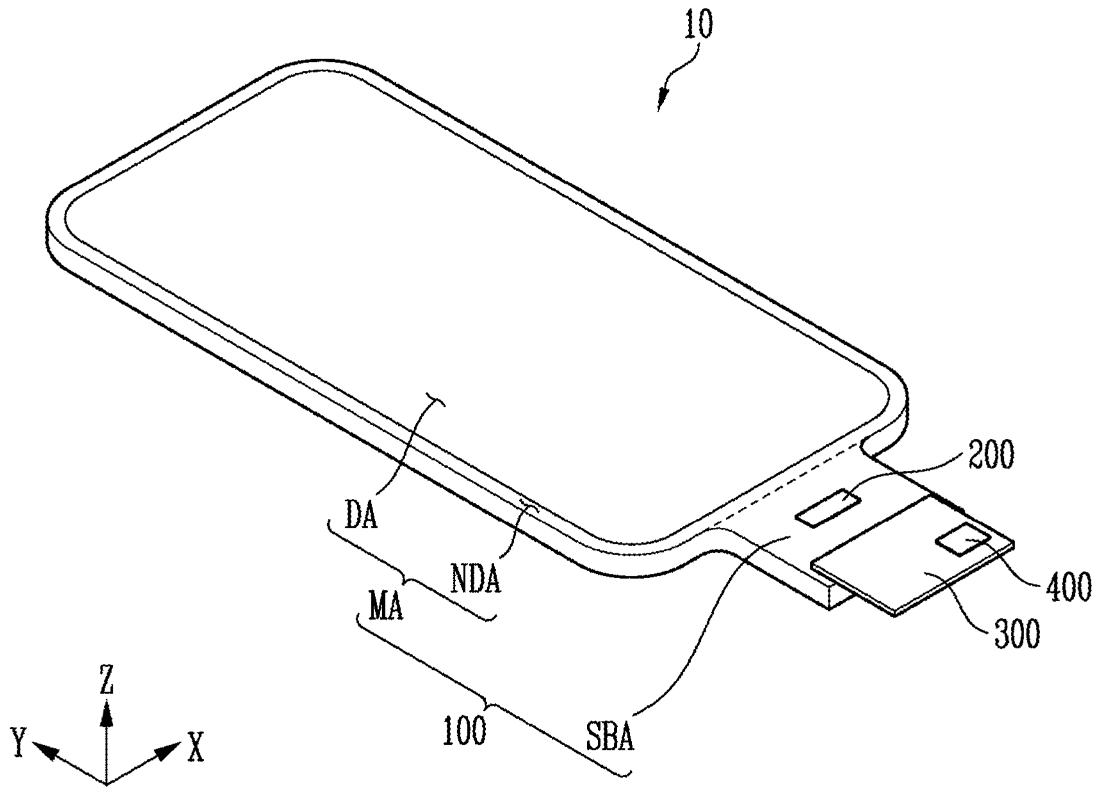
FIG. 1 is a perspective view of a display device according to some embodiments.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a display device according to some embodiments.

Referring to FIG. 1, the display device 10 may be implemented as a variety of suitable electronic devices that provide a display screen. For example, the display device 10 may be applied to various suitable portable electronic devices, such as mobile phones, smart phones, tablet personal computers, mobile communication terminals, electronic notebooks, e-books, portable multimedia players (PMPs), navigations, ultra mobile PCs (UMPCs), and the like. For example, the display device 10 may be applied to televisions, laptops, monitors, billboards, Internet of Things (IoT) devices, and the like. For example, the display device 10 may be applied to various suitable wearable devices, such as smart watches, watch phones, glasses-type displays, head-mounted displays (HMDs), and the like.

The display device 10 may have a planar shape similar to that of a rectangle. For example, the display device 10 may have a rectangular planar shape having a short side extending in a first direction (X) and a long side extending in a second direction (Y). The corner where the short side extending in the first direction (X) and the long side extending in the second direction (Y) meet each other may have a rounded shape with a suitable curvature (e.g., a predetermined curvature), or may have a right-angled shape. The planar shape of the display device 10 is not limited to the rectangle, and may include various suitable shapes, such as those similar to other polygons, a circle, or an ellipse.

At least one of the front surface or the rear surface of the display device 10 may be a display surface. The "front surface" may refer to a surface positioned on one side of a plane in a third direction (Z), and the "rear surface" may refer to a surface positioned on another side (e.g., an opposite side) of the plane in a direction opposite to the third direction (Z). In some embodiments, the display device 10 may be a dual-sided display device including displays provided on both the front surface and the rear surface thereof. However, for convenience of illustration, the display surface may be described in more detail hereinafter as being positioned on the front surface of the display device 10.

The first direction (X) may refer to a direction parallel to or substantially parallel to one side of the display device 10 when viewed on a plane (e.g., in a plan view), and may refer to the short side direction of the display device 10. The second direction (Y) may refer to a direction parallel to or substantially parallel to another side adjacent to the one side of the display device 10 when viewed on a plane (e.g., in a plan view), and may refer to the long side direction of the display device 10. The third direction (Z) may refer to a thickness direction of the display device 10.

The display device 10 may include a display panel 100 that provides a display screen, a display driver 200, a circuit board 300, and a touch driver 400.

The display panel 100 may have a planar shape similar to a rectangle. For example, the display panel 100 may have a rectangular planar shape having a short side extending in the first direction (X), and a long side extending in the second direction (Y). The corner where the short side extending in the first direction (X) and the long side extending in the second direction (Y) meet each other may have a rounded shape with a suitable curvature (e.g., a predetermined curvature), or may have a right-angled shape. The planar shape of the display panel 100 is not limited to the rectangle, and may include various suitable shapes, such as those similar to other polygons, a circle, or an ellipse. Additionally, the display panel 100 may be flexibly formed to allow it to bend or curve.

The display panel 100 may include a main area (MA) and a sub-area (SBA).

The main area (MA) may include a display area (DA), and a non-display area (NDA) disposed around (e.g., a periphery of) the display area (DA). The display area (DA) may include pixels (PX) (e.g., see FIG. 7) that display the image. The non-display area (NDA) may be an area located outside the display area (DA). The non-display area (NDA) may be defined as the edge area of the main area (MA) of the display panel 100. The non-display area (NDA) may include a gate driver that supplies gate signals, a data driver that supplies data signals, wirings connected to the pixels (PX), and the like.

The sub-area (SBA) may extend from one side of the main area (MA). The sub-area (SBA) may be bent in the third direction (Z) to overlap with the main area (MA). The sub-area (SBA) may include a pad portion that connects to the display driver 200 and the circuit board 300 to each other.

Figure 2:
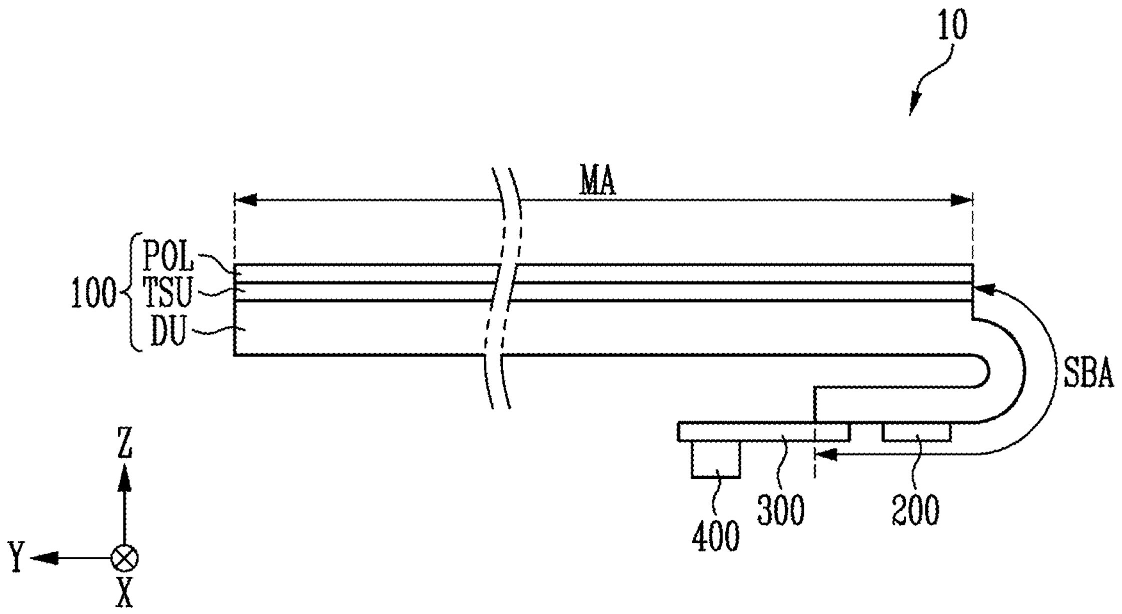
FIG. 2 is a cross-sectional view of a display device according to some embodiments.

FIG. 2 is a cross-sectional view of a display device according to some embodiments.

Referring to FIG. 2, the display panel 100 may include a display unit (e.g., a display or a display layer) (DU), a touch sensor (TSU), and a polarizing layer (POL).

Figure 7:
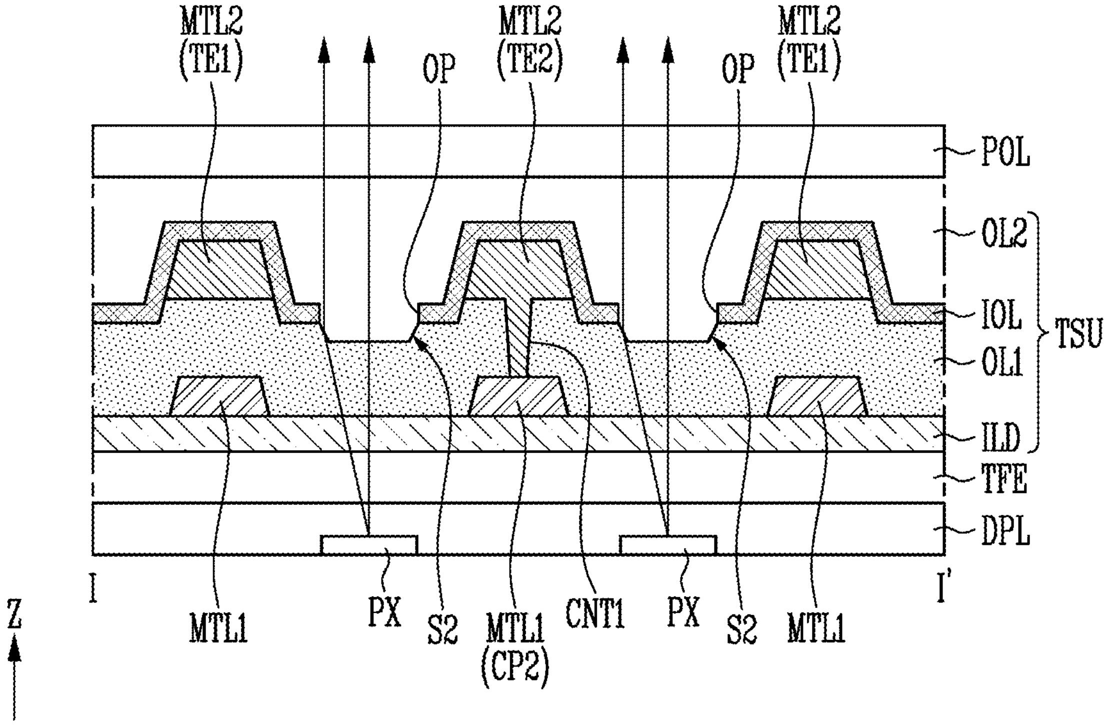
FIG. 7 is a cross-sectional view taken along the line I-I' of FIG. 3 according to some embodiments.

The display unit (DU) may include the pixels (PX) (e.g., see FIG. 7). The pixels (PX) may be a basic unit of displaying a screen. Each of the pixels (PX) may include red, green, and blue sub-pixels, but the present disclosure is not necessarily limited thereto. The pixels (PX) may be alternately arranged on a plane. For example, the pixels (PX) may be disposed in a matrix form, but the present disclosure is not necessarily limited thereto.

The touch sensor (TSU) may be disposed on the display unit (DU). The touch sensor (TSU) may detect a user's touch in a capacitive manner, but the present disclosure is not necessarily limited thereto. The touch sensor (TSU) may include first and second touch electrodes (TE1, TE2) (e.g., see FIG. 3), touch pads (TP), and first and second wirings (WP1, WP2) to connect the first and second touch electrodes (TE1, TE2) to the touch pads (TP). The touch sensor (TSU) may determine whether or not a touch input is made, and may calculate a corresponding position as a touch input coordinate. The touch sensor (TSU) will be described in more detail below with reference to FIG. 3.

The sub-area (SBA) of the display panel 100 may extend from one side of the main area (MA). The sub-area (SBA) may include a flexible material capable of bending, folding, rolling, and the like. For example, one portion of the sub-area (SBA) may be bent from one side of the main area (MA), and another portion of the sub-area (SBA) extending from the bent portion of the sub-area (SBA) may overlap with the main area (MA) in the third direction (Z). The sub-area (SBA) may include a pad portion that connects to the display driver 200 and the circuit board 300.

The display driver 200 may be disposed in the sub-area (SBA) of the display panel 100. For example, the display driver 200 may be implemented as an integrated circuit (IC), and may be mounted on the display panel 100 using a COP (chip on plastic) method or a COG (chip on glass) method. The display driver 200 may output gate signals, data signals, voltages, and the like to drive the display unit (DU).

The circuit board 300 may be disposed in the sub-area (SBA) of the display panel 100. Lead wirings of the circuit board 300 may be electrically connected to the pad portion of the display panel 100. The circuit board 300 may be a flexible film, such as a flexible printed circuit board, a printed circuit board, or a chip-on-film. The circuit board 300 may include third and fourth wirings (WP3, WP4) (e.g., see FIG. 3) for transmitting signals from a main circuit board to the display driver 200, or for electrically connecting the touch driver 400 to the first and second touch electrodes (TE1, TE2) of the touch sensor (TSU).

The touch driver 400 may be mounted on the circuit board 300. The touch driver 400 may calculate a presence of the touch input and the touch coordinates based on a detection of an amount of change in a capacitance between the first and second touch electrodes (TE1, TE2). The touch driver 400 may be implemented as an integrated circuit (IC), and may be mounted on the circuit board 300 using a chip on plastic (COP) method or a chip on glass (COG) method.

Figure 3:
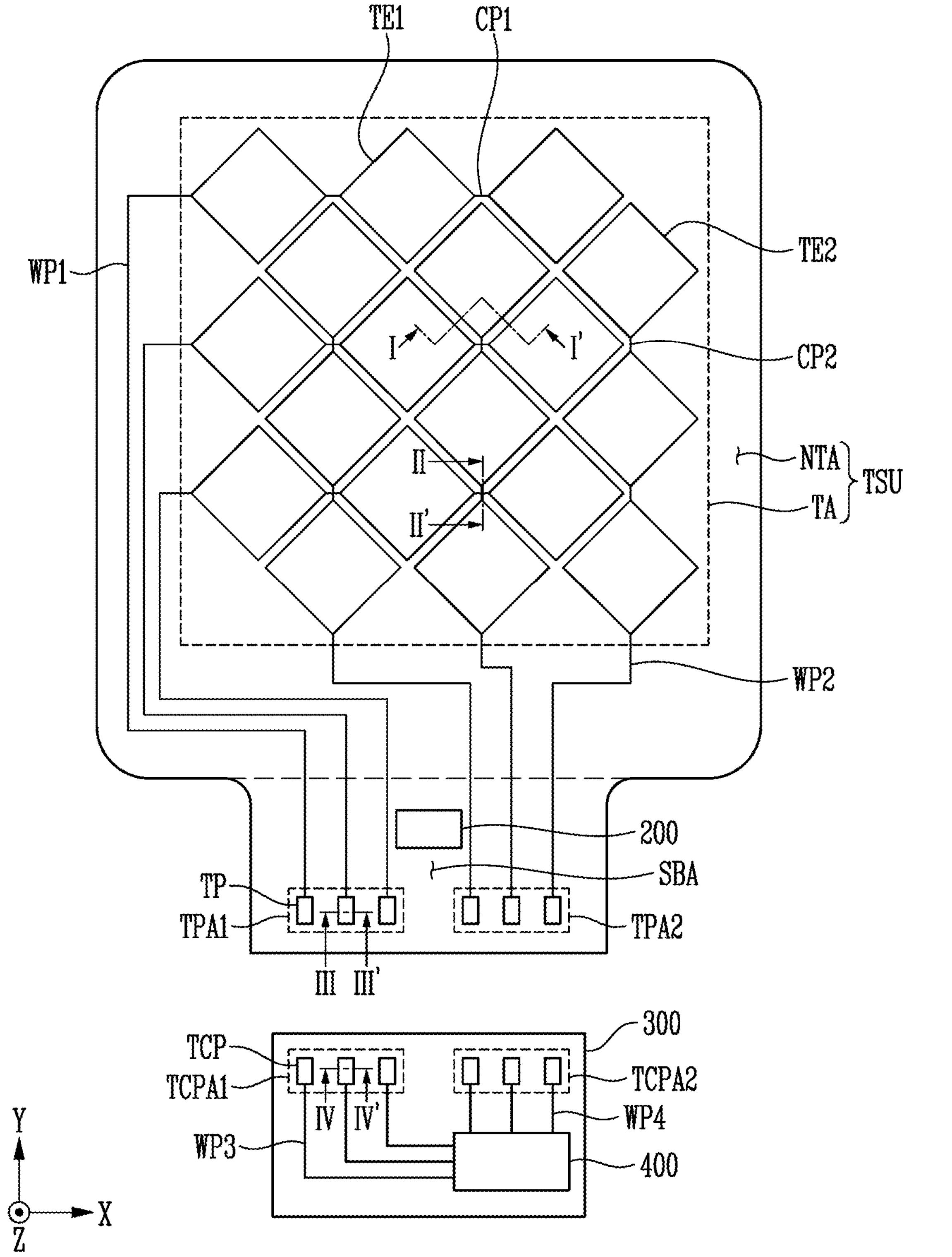
FIG. 3 is a plan view of a touch sensor according to some embodiments.

FIG. 3 is a plan view of a touch sensor according to some embodiments.

Referring to FIG. 3, the touch sensor (TSU) may include a touch-sensing area (TA), and a touch non-sensing area (NTA) disposed around (e.g., a periphery of) the touch-sensing area (TA). The touch-sensing area (TA) may overlap with the display area (DA) (e.g., see FIG. 1), and the touch non-sensing area (NTA) may overlap with the non-display area (NDA).

The touch-sensing area (TA) may include first touch electrodes (TE1), first connecting portions (CP1), second touch electrodes (TE2), and second connecting portions (CP2).

The first touch electrodes (TE1) may be arranged along the first direction (e.g., a row direction) (X). The first connecting portions (CP1) may connect the first touch electrodes (TE1) to each other in the first direction (X). The second touch electrodes (TE2) may be arranged along the second direction (e.g., a column direction) (Y). The second connecting portions (CP2) may connect the second touch electrodes (TE2) to each other in the second direction (Y). The first touch electrodes (TE1) and the second touch electrodes (TE2) may be arranged in multiple rows and columns, so as not to overlap with each other.

The first and second touch electrodes (TE1, TE2) may be implemented in various suitable shapes, such as rectangular shapes, diamond shapes, and the like, and each of the shapes may include a mesh structure.

The first and second connecting portions (CP1, CP2) may cross or intersect with each other, and may be electrically insulated from each other by a first organic layer (OL1) (e.g., see FIG. 5) in a crossing or intersecting area.

The touch non-sensing area (NTA) may include first wirings (WP1) and second wirings (WP2).

The first wirings (WP1) may connect the first touch electrodes (TE1) to the touch pads (TP) disposed in the sub-area (SBA) of the display panel (100) (e.g., see FIG. 2). For example, the first touch electrodes (TE1) may be electrically connected to the touch pads (TP) disposed in a first touch pad area (TPA1) through the first wirings (WP1). The second wirings (WP2) may connect the second touch electrodes (TE2) to the touch pads (TP) disposed in the sub-area (SBA) of the display panel 100. For example, the second touch electrodes (TE2) may be electrically connected to the touch pads (TP) disposed in a second touch pad area (TPA2) through the second wirings (WP2).

The circuit board 300 may include circuit pads (TCP), third wirings (WP3), and fourth wirings (WP4).

The circuit pads (TCP) may be electrically connected to the touch pads (TP) of the display panel 100. For example, the circuit pads (TCP) disposed in a first circuit pad area (TCPA1) may be electrically connected to the touch pads (TP) disposed in the first touch pad area (TPA1). For example, the circuit pads (TCP) disposed in a second circuit pad area (TCPA2) may be electrically connected to the touch pads (TP) disposed in the second touch pad area (TPA2).

The third wirings (WP3) may connect the circuit pads (TCP) in the first circuit pad area (TCPA1) to the touch driver 400. The fourth wirings (WP4) may connect the circuit pads (TCP) in the second circuit pad area (TCPA2) to the touch driver 400.

The first touch electrodes (TE1) may receive touch driving signals from the touch driver 400 disposed on the circuit board 300 through the first wirings (WP1). When a touch driving signal is applied to the first touch electrodes (TE1), a mutual capacitance may be formed between adjacent first touch electrodes (TE1) and second touch electrodes (TE2). When a touch input is generated from the outside, a value of the mutual capacitance between the adjacent first touch electrode (TE1) and second touch electrode (TE2) may change. The change in the value of the mutual capacitance may be transmitted to the touch driver 400 through the second wirings (WP2). Accordingly, the touch driver 400 may determine whether or not a touch input is made, and may calculate a corresponding position of the touch input as a touch input coordinate.

Figure 4:
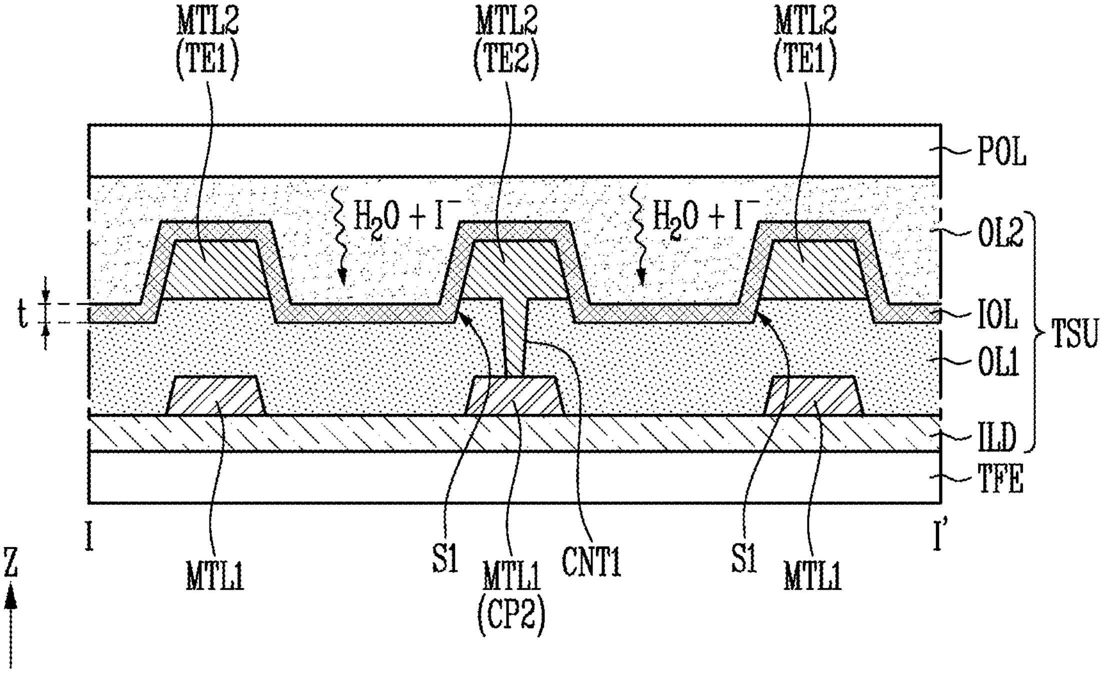
FIG. 4 is a cross-sectional view taken along the line I-I' of FIG. 3 according to some embodiments.

FIG. 4 is a cross-sectional view taken along the line I-I' of FIG. 3 according to some embodiments.

Referring to FIG. 4, the touch sensor (TSU) may be disposed on an encapsulation layer (TFE). The encapsulation layer (TFE) is a layer positioned at the top of the display unit (DU) (e.g., see FIG. 2), and may prevent or substantially prevent the penetration of foreign substances, such as oxygen, moisture, and the like, into the display unit (DU). The touch sensor (TSU) may include an interlayer insulating layer (ILD), a first conductive layer (MTL1), a first organic layer (OL1), a second conductive layer (MTL2), and an inorganic layer (IOL). According to some embodiments, the touch sensor (TSU) may further include a second organic layer (OL2).

The interlayer insulating layer (ILD) may be disposed on the encapsulation layer (TFE). The interlayer insulating layer (ILD) may be an inorganic insulating layer that includes inorganic insulating materials, such as silicon oxide, silicon nitride, and/or silicon oxynitride. The interlayer insulating layer (ILD) may have a single-layer structure or a multi-layered structure including one or more of the aforementioned materials.

The first conductive layer (MTL1) may be disposed on the interlayer insulating layer (ILD). The first conductive layer (MTL1) may have a mesh structure. The first conductive layer (MTL1) may include metals, such as aluminum, copper, molybdenum, gold, titanium, chromium, nickel, iron, zinc, indium, gallium, magnesium, and/or manganese. The first conductive layer (MTL1) may have a single-layer structure or a multi-layered structure including one or more of the aforementioned materials. The first conductive layer (MTL1) may include the second connecting portions (CP2) connecting the second touch electrodes (TE2) to each other.

The first organic layer (OL1) may be disposed on the interlayer insulating layer (ILD) and the first conductive layer (MTL1). The first organic layer (OL1) may cover the first conductive layer (MTL1). The first organic layer (OL1) may be an organic insulating layer that includes organic insulating materials, such as a polyacrylate resin, an epoxy resin, a phenolic resin, a polyamide resin, a polyimide resin, an unsaturated polyester resin, a polyphenylene ether resin, a polyphenylene sulfide resin, and/or a benzocyclobutene resin. The first organic layer (OL1) may have a single-layer structure or a multi-layered structure including one or more of the aforementioned materials.

The second conductive layer (MTL2) may be disposed on the first organic layer (OL1). The second conductive layer (MTL2) may have a mesh structure. The second conductive layer (MLT2) may overlap with the first conductive layer (MTL1). The second conductive layer (MTL2) may include metals, such as aluminum, copper, molybdenum, gold, titanium, chromium, nickel, iron, zinc, indium, gallium, magnesium, and/or manganese. The second conductive layer (MTL2) may have a single-layer structure or a multi-layered structure including one or more of the aforementioned metals. The second conductive layer (MTL2) may include the first touch electrodes (TE1), the first connecting portions (CP1) (e.g., see FIG. 5), and the second touch electrodes (TE2). In other words, the first touch electrodes (TE1), the first connecting portions (CP1), and the second touch electrodes (TE2) may be disposed at (e.g., in or on) the same layer as each other, while the second connecting portions (CP2) may be disposed at (e.g., in or on) a different layer from that of the first touch electrodes (TE1), the first connecting portions (CP1), and the second touch electrodes (TE2).

The first organic layer (OL1) may include first stepped portions (S1) adjacent to the second conductive layer (MTL2). The first stepped portions (S1) of the first organic layer (OL1) may be formed by a partial loss of the first organic layer (OL1) in a process of forming the second conductive layer (MTL2).

The inorganic layer (IOL) may be disposed on the first organic layer (OL1) and the second conductive layer (MTL2). The inorganic layer (IOL) may cover an upper surface and a side surface of the second conductive layer (MTL2). In addition, the inorganic layer (IOL) may cover the first stepped portions (S1) of the first organic layer (OL1). The inorganic layer (IOL) may be an inorganic insulating layer that includes inorganic insulating materials, such as silicon oxide, silicon nitride, and/or silicon oxynitride. The inorganic layer (IOL) may have a single-layer structure or a multi-layered structure including one or more of the aforementioned materials. A thickness (t) of the inorganic layer (IOL) may be about 200 angstroms to about 10000 angstroms.

The inorganic layer (IOL) may block the penetration of foreign substances into the touch sensor (TSU). For example, the inorganic layer (IOL) may prevent or substantially prevent moisture and iodine ions diffusing from the polarizing layer (POL) from penetrating into the first and second conductive layers (MTL1, MTL2), thereby preventing corrosion of the first and second conductive layers (MTL1, MTL2). In more detail, the inorganic layer (IOL) may block the penetration of moisture and iodine ions, which may rapidly diffuse from the polarizing layer (POL) under hot and humid conditions, thereby preventing the corrosion of the first and second conductive layers (MTL1, MTL2). Accordingly, a reliability of the touch sensor (TSU) may increase.

The second organic layer (OL2) may be disposed on the inorganic layer (IOL). The second organic layer (OL2) covers the inorganic layer (IOL), and may have an overall flat or substantially flat surface. For example, the second organic layer (OL2) may flatten the steps of the inorganic layer (IOL). The second organic layer (OL2) may be an organic insulating layer having a single-layer structure or a multi-layered structure including one or more organic insulating materials. The second organic layer (OL2) may have a higher refractive index than that of the first organic layer (OL1). According to some embodiments, the second organic layer (OL2) may be omitted as needed or desired.

The polarizing layer (POL) may be disposed on the touch sensor (TSU). The polarizing layer (POL) may polarize incident light. For example, the polarizing layer (POL) may have a polarization axis in a constant direction, and an absorption axis that crosses or intersects the polarization axis. When light is incident on the polarizing layer (POL), the components vibrating in a direction parallel to the polarization axis are transmitted, while the components vibrating in other directions may be absorbed or dispersed. The polarizing layer (POL) may be formed by stretching a polymer film dyed with a dichroic material, such as iodine, in one direction. For example, the polymer film may include a polyvinyl alcohol film, a polyethylene terephthalate film, an ethylene-vinyl acetate copolymer film, an ethylene-vinyl alcohol copolymer film, and/or a cellulose film.

Figure 5:
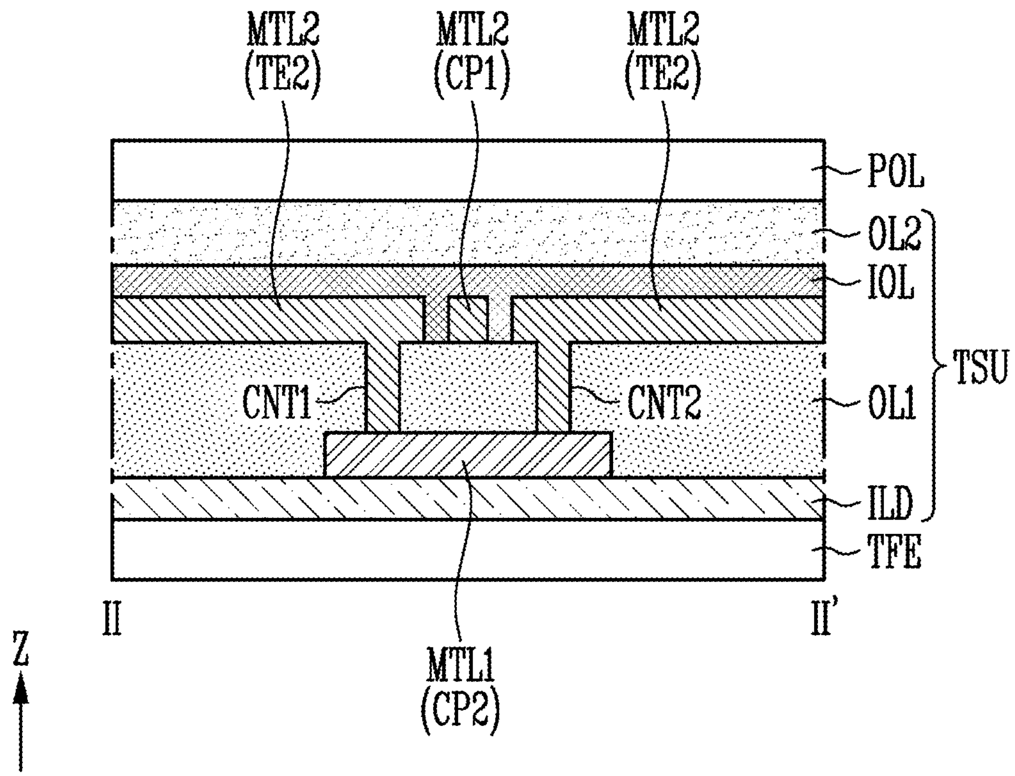
FIG. 5 is a cross-sectional view taken along the line II-II' of FIG. 3 according to some embodiments.

FIG. 5 is a cross-sectional view taken along the line II-II' of FIG. 3 according to some embodiments. Hereinafter with reference to FIG. 5, redundant description of the same or substantially the same components and configurations as those described above with reference to FIG. 4 may be briefly summarized, or may not be repeated.

Referring to FIG. 5, the adjacent second touch electrodes (TE2) may be electrically connected to each other through the second connecting portion (CP2). For example, one of the second touch electrodes (TE2), such as the left second touch electrode (TE2), may be electrically connected to the second connecting portion (CP2) through a first contact hole (CNT1). For example, the other one of the second touch electrodes (TE2), such as the right second touch electrode (TE2), may be electrically connected to the second connecting portion (CP2) through a second contact hole (CNT2).

The adjacent first touch electrodes (TE1) (e.g., see FIG. 4) may be electrically connected to each other through the first connecting portion (CP1).

The first connecting portion (CP1) and the second connecting portion (CP2) may cross or intersect with each other, and may be electrically insulated from each other by the first organic layer (OL1).

Figure 6:
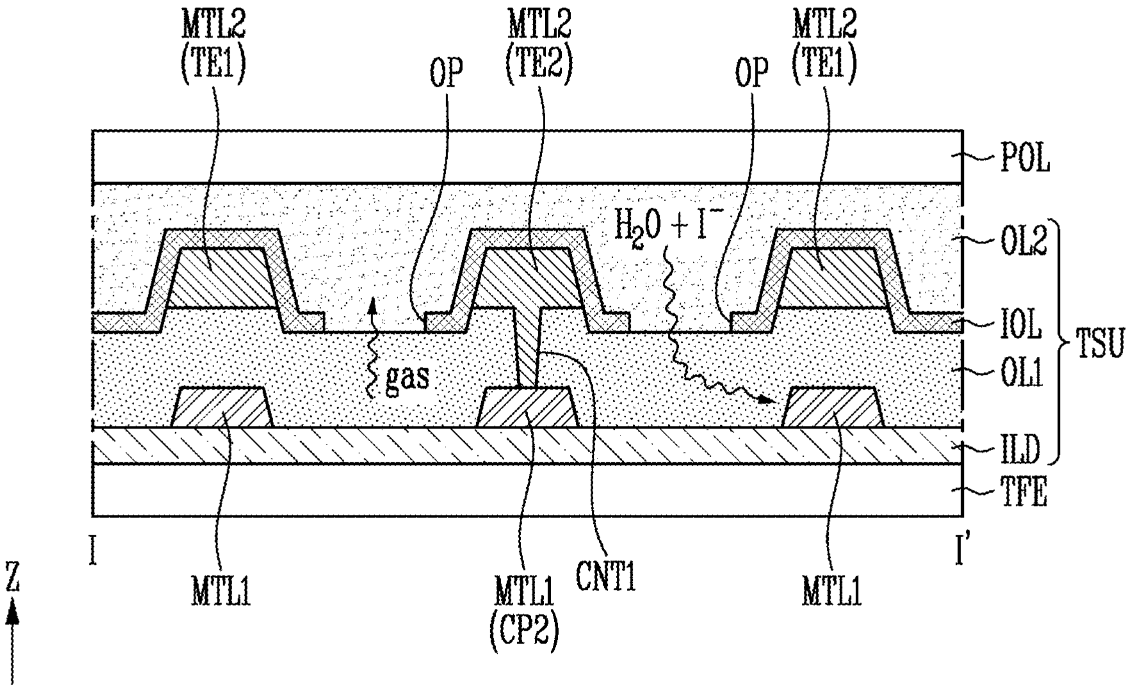
FIG. 6 is a cross-sectional view taken along the line I-I' of FIG. 3 according to some embodiments.

FIG. 6 is a cross-sectional view taken along the line I-I' of FIG. 3 according to some embodiments. Hereinafter with reference to FIG. 6, redundant description of the same or substantially the same components and configurations as those described above with reference to FIG. 4 may be briefly summarized, or may not be repeated.

Referring to FIG. 6, the inorganic layer (IOL) may include openings (OP). The openings (OP) may be formed at positions that do not overlap with the first conductive layer (MTL1) and the second conductive layer (MTL2). The openings (OP) may be formed by etching the inorganic layer (IOL) corresponding to the positions. The second organic layer (OL2) may be disposed on the first organic layer (OL1) by filling the openings (OP).

The openings (OP) may vent gases that may be emitted from the first organic layer (OL1), thus preventing or substantially preventing defects, such as bubbles, cracks, and the like. Unlike that illustrated in FIG. 6, when the inorganic layer (IOL) is fully formed on the first organic layer (OL1), gases that may be emitted from the first organic layer (OL1) may become trapped in the inorganic layer (IOL) and fail to be vented, thus leading to defects, such as bubbles and cracks.

Even if the openings (OP) are formed, the inorganic layer (IOL) may be partially disposed on the first organic layer (OL1). The inorganic layer (IOL) may increase a pathway for the movement of moisture and iodine ions diffusing from the polarizing layer (POL), thereby delaying the corrosion of the first conductive layer (MTL1).

FIG. 7 is a cross-sectional view taken along the line I-I' of FIG. 3 according to some embodiments. Hereinafter with reference to FIG. 7, redundant description of the same or substantially the same components and configurations as those described above with reference to FIG. 4 and FIG. 6 may be briefly summarized, or may not be repeated. For convenience of illustration, a display element layer (DPL) including the pixels (PX) is shown in FIG. 7. The display element layer (DPL) may be a component included in the display unit (DU) (e.g., see FIG. 2), and may be disposed below the encapsulation layer (TFE).

Referring to FIG. 7, the first organic layer (OL1) may include second stepped portions (S2) adjacent to the openings (OP). The second stepped portions (S2) of the first organic layer (OL1) may be formed by a partial loss of the first organic layer (OL1) in a process of forming the openings (OP). As the second stepped portions (S2) inclined to the first organic layer (OL1) are formed, the first organic layer (OL1) may have an inverted taper shape having a width that decreases along the thickness direction (Z). On the other hand, the second organic layer (OL2) disposed on the first organic layer (OL1) may have a taper shape having a width that increases along the thickness direction (Z).

The second organic layer (OL2) may have a higher refractive index than that of the first organic layer (OL1). The difference in refractive index may change the path of light emitted from the pixels (PX) and incident on interfaces between the first organic layer (OL1) and the second organic layer (OL2). For example, the path of light emitted from the pixels (PX) and incident on the second stepped portions (S2) of the first organic layer (OL1) may be changed in the thickness direction (Z). Accordingly, the light emitted to the display surface may be increased, thereby increasing the luminance (e.g., an optical efficiency) of the display device (10) (e.g., see FIG. 1).

Figure 8:
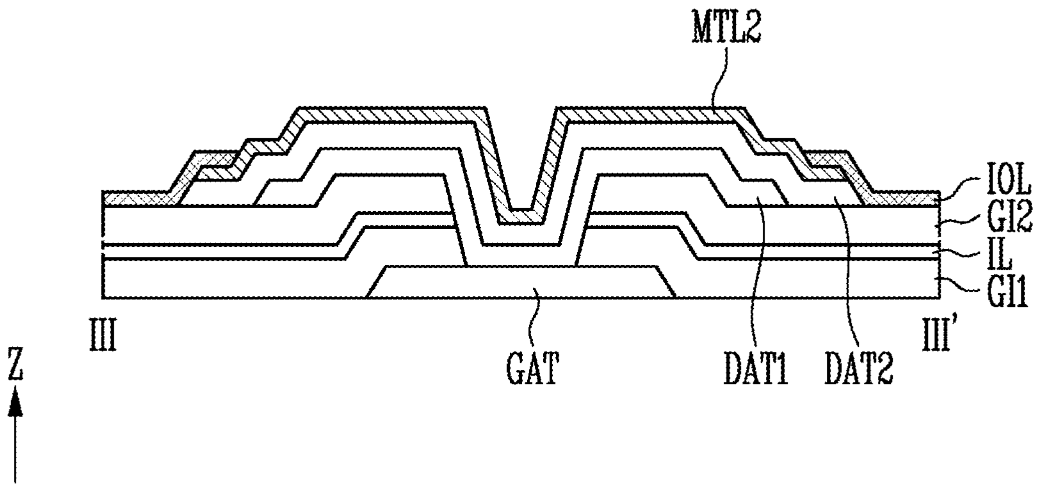
FIG. 8 is a cross-sectional view taken along the line III-III' of FIG. 3 according to some embodiments.

FIG. 8 is a cross-sectional view taken along the line III-III' of FIG. 3 according to some embodiments. Hereinafter with reference to FIG. 8, a schematic stacking structure of the touch pads (TP) (e.g., see FIG. 3) is described in more detail.

Referring to FIG. 8, a first gate insulating layer (GI1) may be disposed on a gate layer (GAT). The gate layer (GAT) may include various suitable materials, such as copper, molybdenum, tungsten, aluminum-neodymium, titanium, aluminum, and/or silver. The gate layer (GAT) may have a single-layer structure or a multi-layered structure including one or more of the aforementioned materials. The first gate insulating layer (GI1) may be an inorganic insulating layer including inorganic insulating materials, such as silicon nitride, silicon oxide, silicon oxynitride, and/or aluminum oxide. However, the present disclosure is not limited thereto. The first gate insulating layer (GI1) may be an organic insulating layer including organic insulating materials. The first gate insulating layer (GI1) may have a single-layer structure or a multi-layered structure including one or more of the aforementioned materials.

An insulating layer (IL) may be disposed on the first gate insulating layer (GI1). The insulating layer (IL) may include (e.g., may consist of) the same or substantially the same material as that of the first gate insulating layer (GI1), but the present disclosure is not necessarily limited thereto.

A second gate insulating layer (GI2) may be disposed on the insulating layer (IL). The second gate insulating layer (GI2) may include (e.g., may consist of) the same or substantially the same material as that of the first gate insulating layer (GI1), but the present disclosure is not limited thereto.

A first data layer (DAT1) may be disposed on the second gate insulating layer (GI2). The first data layer (DAT1) may be electrically connected to the gate layer (GAT) by penetrating the first gate insulating layer (GI1), the insulating layer (IL), and the second gate insulating layer (GI2). The first data layer (DAT1) may include various suitable materials, such as aluminum, platinum, palladium, silver, magnesium, gold, nickel, neodymium, iridium, chromium, nickel, calcium, molybdenum, titanium, tungsten, and/or copper (Cu). The first data layer (DAT1) may have a single-layer structure or a multi-layered structure including one or more of the aforementioned materials.

A second data layer (DAT2) may be disposed on the first data layer (DAT1) and the second gate insulating layer (GI2). The second data layer (DAT2) may cover the first data layer (DAT1). The second data layer (DAT2) may include (e.g., may consist of) the same or substantially the same material as that of the first data layer (DAT1), but the present disclosure is not limited thereto.

The second conductive layer (MTL2) may be disposed on the second data layer (DAT2). Unlike that of the touch sensor (TSU) (e.g., see FIG. 4), the touch pad (TP) (e.g., see FIG. 3) may not include the first organic layer (OL1). As such, defects in the touch pad (TP) that may be caused by the compression of a relatively thick first organic layer (OL1) may be prevented. In this case, a side surface of the touch pad (TP) may be exposed. For example, the second data layer (DAT2) and the second conductive layer (MTL2) may be exposed and may be corroded.

The inorganic layer (IOL) may be disposed on the second gate insulating layer (GI2), the second data layer (DAT2), and the second conductive layer (MTL2). The inorganic layer (IOL) may cover the second data layer (DAT2), and at least a part of the second conductive layer (MTL2). In other words, the inorganic layer (IOL) may cover the side surface of the touch pad (TP) to prevent or substantially prevent the corrosion of the touch pad (TP).

Figure 9:
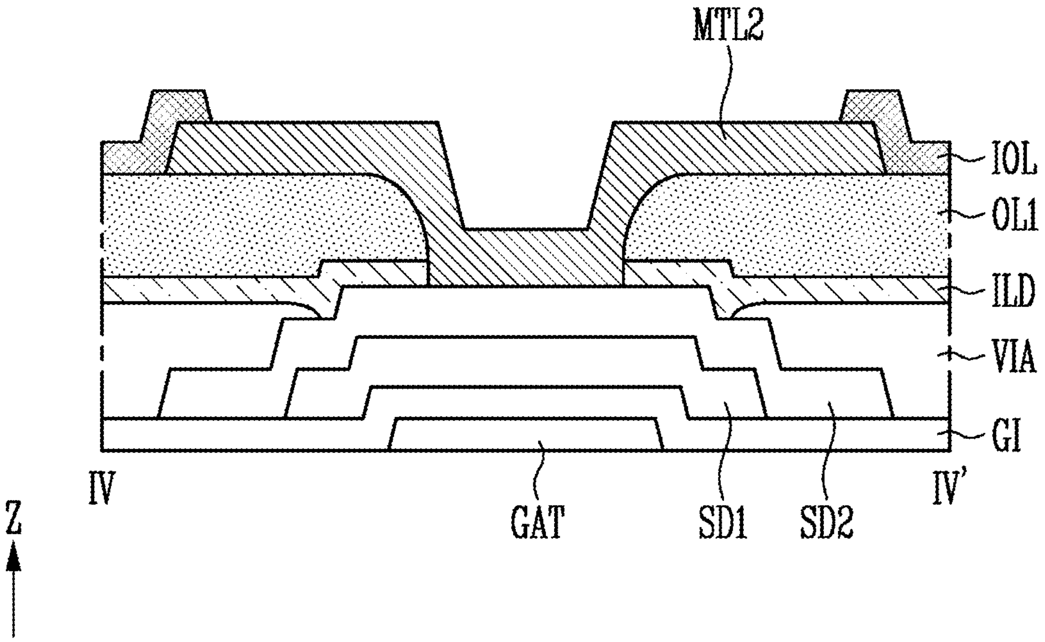
FIG. 9 is a cross-sectional view taken along the line IV-IV' of FIG. 3 according to some embodiments.

FIG. 9 is a cross-sectional view taken along the line IV-IV' of FIG. 3 according to some embodiments. In FIG. 9, a schematic stacking structure of the circuit pads (TCP) (e.g., see FIG. 3) is illustrated as having a spacing between the circuit pads (TCP) that is relatively large. Hereinafter with reference to FIG. 9, redundant description of the same or substantially the same components and configurations as those described above may be briefly summarized, or may not be repeated.

Referring to FIG. 9, a gate insulating layer (GI) may be disposed on the gate layer (GAT). The gate insulating layer (GI) may be an inorganic insulating layer including inorganic insulating materials, such as silicon nitride, silicon oxide, silicon oxynitride, and/or aluminum oxide. However, the present disclosure is not limited thereto. The gate insulating layer (GI) may be an organic insulating layer including organic insulating materials. The gate insulating layer (GI) may have a single-layer structure or a multi-layered structure including one or more of the aforementioned materials.

A first source-drain layer (SD1) may be disposed on the gate insulating layer (GI). The first source-drain layer (SD1) may include various suitable materials, such as copper, molybdenum, tungsten, aluminum-neodymium, titanium, aluminum, and/or silver. The first source-drain layer (SD1) may have a single-layer structure or a multi-layered structure including one or more of the aforementioned materials.

A second source-drain layer (SD2) may be disposed on the gate insulating layer (GI) and the first source-drain layer (SD1). The second source-drain layer (SD2) may cover the first source-drain layer (SD1). The second source-drain layer (SD2) may include (e.g., may consist of) the same or substantially the same material as that of the first source-drain layer (SD1), but the present disclosure is not limited thereto.

A via layer (VIA) may be disposed on the gate insulating layer (GI) and the second source-drain layer (SD2). The via layer (VIA) may partially cover the second source-drain layer (SD2). The via layer (VIA) may include at least one of silicon oxide, silicon nitride, or silicon carbon nitride, but the present disclosure is not limited thereto.

The interlayer insulating layer (ILD) may be disposed on the via layer (VIA) and the second source-drain layer (SD2).

The first organic layer (OL1) may be disposed on the interlayer insulating layer (ILD).

The second conductive layer (MTL2) may be disposed on the first organic layer (OL1). The second conductive layer (MTL2) may be electrically connected to the second source-drain layer (SD2) by penetrating through the interlayer insulating layer (ILD) and the first organic layer (OL1).

As illustrated in FIG. 9, the side surface of the circuit pads (TCP) (e.g., see FIG. 3) may be exposed. For example, the second conductive layer (MTL2) may be exposed and corroded.

The inorganic layer (IOL) may be disposed on the first organic layer (OL1) and the second conductive layer (MTL2). The inorganic layer (IOL) may cover at least a part of the second conductive layer (MTL2). In other words, the inorganic layer (IOL) may cover the side surface of the circuit pads (TCP) to prevent or substantially prevent the corrosion of the circuit pads (TCP).

Figure 10:
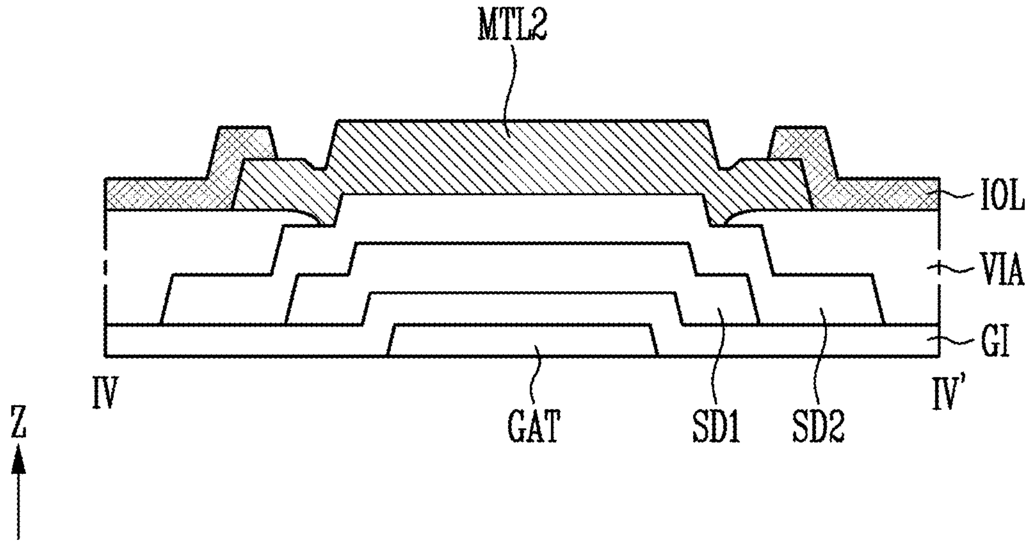
FIG. 10 is a cross-sectional view taken along the line IV-IV' of FIG. 3 according to some embodiments.

FIG. 10 is a cross-sectional view taken along the line IV-IV' of FIG. 3 according to some embodiments. In FIG. 10, a schematic stacking structure of the circuit pads (TCP) (e.g., see FIG. 3) is illustrated as having a spacing between the circuit pads (TCP) that is relatively small. Hereinafter with reference to FIG. 10, redundant description of the same or substantially the same components and configurations as those described above may be briefly summarized, or may not be repeated.

Referring to FIG. 10, the second conductive layer (MTL2) may be disposed on the second source-drain layer (SD2) and the via layer (VIA). The circuit pads (TCP) (e.g., see FIG. 3) may not include the first organic layer (OL1) (e.g., see FIG. 4), unlike that of the touch sensor (TSU). As such, defects in the circuit pads (TCP) that may be caused by a compression of a relatively thick first organic layer (OL1) may be prevented. In this case, the side surface of the circuit pads (TCP) may be exposed. For example, the second conductive layer (MTL2) may be exposed and corroded.

The inorganic layer (IOL) may be disposed on the via layer (VIA) and the second conductive layer (MTL2). The inorganic layer (IOL) may cover at least a part of the second conductive layer (MTL2). In other words, the inorganic layer (IOL) may cover the side surface of the circuit pads (TCP) to prevent or substantially prevent the corrosion of the circuit pads (TCP).

A display device according to some embodiments is applicable to various types of electronic devices. In an embodiment, an electronic device includes the above-described display device and may further include other modules or devices having additional functions in addition to the display device.

Figure 11:
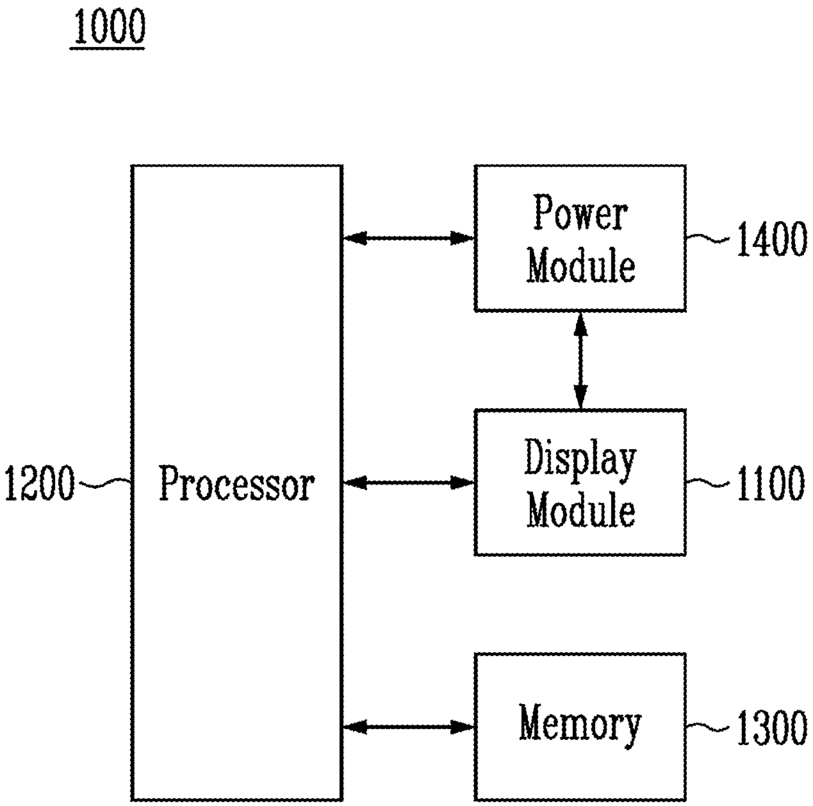
FIG. 11 is a block diagram of an electronic device according to some embodiments.

FIG. 11 is a block diagram of an electronic device according to some embodiments. Referring to FIG. 11, the electronic device 1000 may include a display module 1100, a processor 1200, a memory 1300, and a power module 1400.

The processor 1200 may include at least one of a central processing unit (CPU), an application processor (AP), a graphic processing unit (GPU), a communication processor (CP), an image signal processor (ISP), and a controller.

The memory 1300 may store data and/or information used to operate the processor 1200 or the display module 1100. When the processor 1200 executes an application stored in the memory 1300, image data signals and/or input control signals may be transferred to the display module 1100. The display module 1100 may process the provided signals and output image information on a display screen.

The power module 1400 may include a power supply module, such as a power adapter or a battery device, and a power conversion module. The power conversion module converts power supplied by the power supply module and generates power to operate the electronic device 1000.

At least one of the above-described components of the electronic device 1000 may be included in the display device according to embodiments as described above. In addition, in terms of functionality, some of the individual modules included in one module may be included in the display device and others may be provided separately from the display device. For example, the display module 1100 is included in the display device, whereas the processor 1200, the memory 1300, and the power module 1400 are not included in the display device and are instead provided separately in the electronic device 1000.

Figure 12:
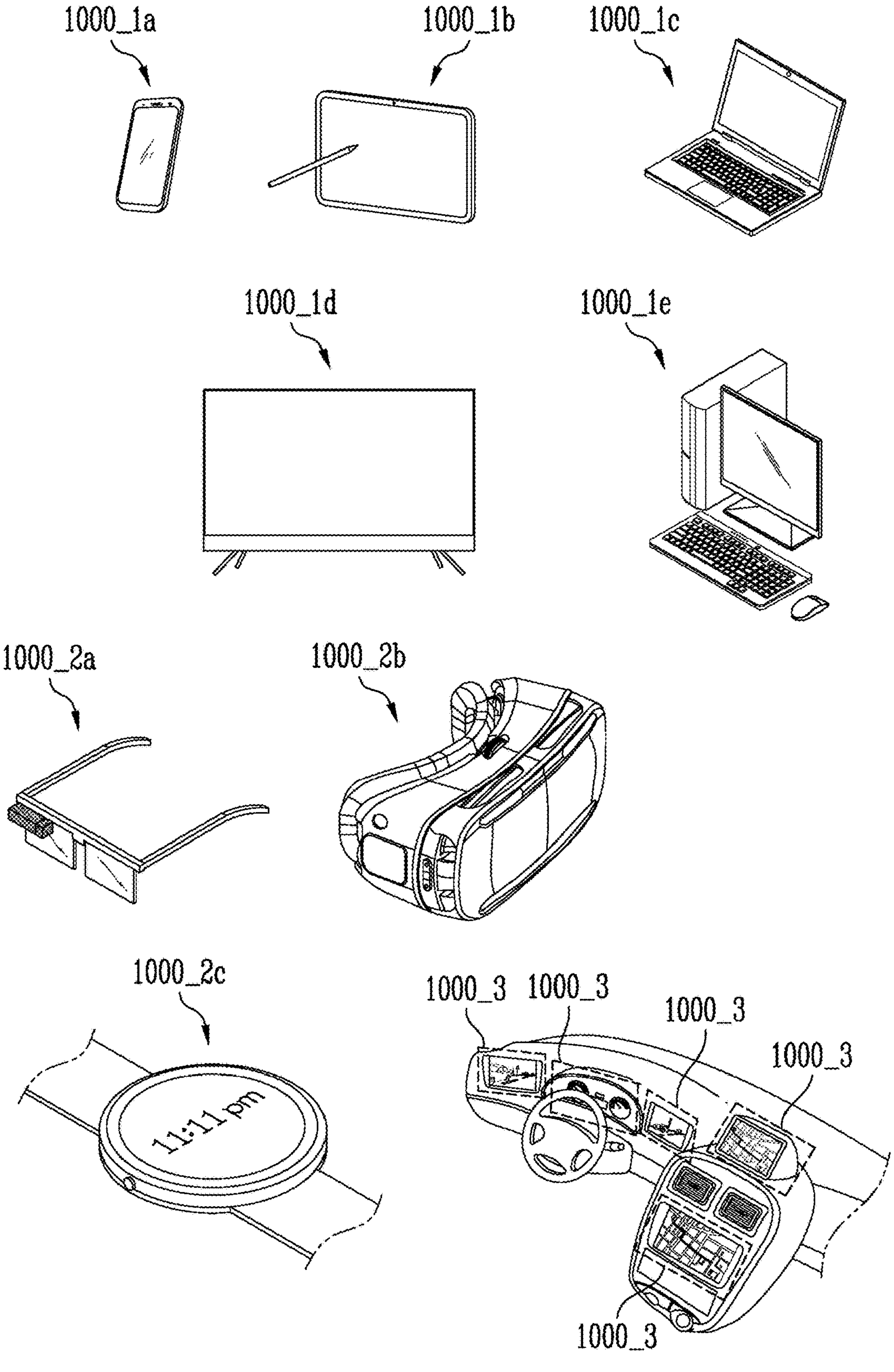
FIG. 12 shows schematic views of various embodiments of an electronic device.

FIG. 12 shows schematic views of various embodiments of an electronic device.

Referring to FIG. 12, various types of electronic devices to which embodiments of a display device are applied may include an electronic device to display images such as a smartphone 1000_1*a*, a tablet PC 1000_1*b*, a laptop computer 1000_1*c*, a television (TV) 1000_1*d*, and a desktop monitor 1000_1*e*, a wearable electronic device including a display module such as smart glasses 1000_2*a*, a head-mounted display (HMD) 1000_2*b*, and a smart watch 1000_2*c*, and an automotive electronic device 1000_3 including a display module such as a center information display (CID) disposed at the instrument cluster, the center fascia, and the dashboard of a vehicle, and a room mirror display.

According to some embodiments, it may be possible to increase a reliability of a touch sensor by blocking gas diffusion into conductive layers of the touch sensor, and thus, preventing or substantially preventing corrosion of the conductive layers.

However, the aspects and features of the present disclosure are not limited to those described above, and various other aspects and features as would be understood by those having ordinary skill in the art may be included in the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A touch sensor comprising:

a touch-sensing area; and a touch non-sensing area around the touch-sensing area, wherein the touch-sensing area comprises:

an interlayer insulating layer on an encapsulation layer;

a first conductive layer on the interlayer insulating layer;

a first organic layer on the interlayer insulating layer and the first conductive layer above the encapsulation layer;

a second conductive layer on the first organic layer; and an inorganic layer above the encapsulation layer and directly on the first organic layer and directly on the second conductive layer.

2. The touch sensor according to claim 1, wherein the inorganic layer covers an upper surface and a side surface of the second conductive layer.

3. The touch sensor of claim 2, wherein the first organic layer comprises first stepped portions adjacent to the second conductive layer.

4. The touch sensor according to claim 3, wherein the inorganic layer covers the first stepped portions of the first organic layer.

5. The touch sensor according to claim 1, wherein a thickness of the inorganic layer is about 200 angstroms to about 10000 angstroms.

6. The touch sensor according to claim 1, wherein the inorganic layer has openings that do not overlap with the first conductive layer and the second conductive layer.

7. The touch sensor according to claim 6, wherein the first organic layer comprises second stepped portions adjacent to the openings.

8. The touch sensor according to claim 7, wherein the touch-sensing area further comprises a second organic layer on the inorganic layer.

9. The touch sensor according to claim 8, wherein the second organic layer covers the second stepped portions of the first organic layer.

10. The touch sensor according to claim 8, wherein the second organic layer has a higher refractive index than that of the first organic layer.

11. The touch sensor according to claim 1, wherein the second conductive layer comprises first touch electrodes along a first direction, second touch electrodes along a second direction crossing the first direction, and a first connecting portion connecting the first touch electrodes to each other, the first conductive layer comprises a second connecting portion connecting the second touch electrodes to each other, and one of the second touch electrodes is connected to the second connecting portion through a first contact hole penetrating the first organic layer, and another one of the second touch electrodes is connected to the second connecting portion through a second contact hole penetrating the first organic layer.

12. A display device comprising:

a display;

a touch sensor on the display, the touch sensor comprising a touch-sensing area, and a touch non-sensing area around the touch-sensing area; and a polarizing layer on the touch sensor, wherein the touch-sensing area comprises:

an interlayer insulating layer on an encapsulation layer of the display;

a first conductive layer on the interlayer insulating layer;

a first organic layer on the interlayer insulating layer and the first conductive layer above the encapsulation layer;

a second conductive layer on the first organic layer; and an inorganic layer above the encapsulation layer and directly on the first organic layer and directly on the second conductive layer.

13. The display device according to claim 12, wherein the inorganic layer covers an upper surface and a side surface of the second conductive layer.

14. The display device according to claim 13, wherein the first organic layer comprises first stepped portions adjacent to the second conductive layer, and the inorganic layer covers the first stepped portions of the first organic layer.

15. The display device according to claim 12, wherein a thickness of the inorganic layer is about 200 angstroms to about 10000 angstroms.

16. The display device according to claim 12, wherein the inorganic layer has openings that do not overlap with the first conductive layer and the second conductive layer.

17. The display device according to claim 16, wherein the first organic layer comprises second stepped portions adjacent to the openings.

18. The display device according to claim 17, wherein the touch-sensing area further comprises a second organic layer on the inorganic layer, and the second organic layer covers the second stepped portions of the first organic layer.

19. The display device according to claim 18, wherein the second organic layer has a higher refractive index than that of the first organic layer.

20. The display device according to claim 12, wherein the second conductive layer comprises:

first touch electrodes along a first direction;

second touch electrodes along a second direction crossing the first direction; and a first connecting portion connecting the first touch electrodes to each other, wherein the first conductive layer comprises a second connecting portion connecting the second touch electrodes to each other, and wherein one of the second touch electrodes is connected to the second connecting portion through a first contact hole penetrating the first organic layer, and another one of the second touch electrodes is connected to the second connecting portion through a second contact hole penetrating the first organic layer.

21. An electronic device comprising:

a display; and a touch sensor on the display, the touch sensor comprising a touch-sensing area, and a touch non-sensing area around the touch-sensing area, wherein the touch-sensing area comprises:

an interlayer insulating layer on an encapsulation layer of the display;

a first conductive layer on the interlayer insulating layer;

a first organic layer on the interlayer insulating layer and the first conductive layer above the encapsulation layer;

a second conductive layer on the first organic layer; and an inorganic layer above the encapsulation layer and directly on the first organic layer and directly on the second conductive layer, and wherein the electronic device is one of a mobile phone, a smart phone, a tablet personal computer, a mobile communication terminal, an electronic notebook, an e-book, a portable multimedia player (PMP), a navigation, an ultra mobile PC, a television, a laptop, a monitor, a billboard, an Internet of Things (IoT) device, a smart watch, a watch phone, a glasses-type display, or a head-mounted display (HMD).

22. The electronic device according to claim 21, wherein the inorganic layer covers an upper surface and a side surface of the second conductive layer.

23. The electronic device according to claim 22, wherein the first organic layer comprises first stepped portions adjacent to the second conductive layer.

* * * * *